3,794,597
Patented Feb. 26, 1974

3,794,597
METHOD OF INCREASING BRIGHTNESS OF $Y_2O_2S$:Eu LUMINESCENT MATERIAL
Emil J. Mehalchick, Towanda, and James E. Mathers, Ulster, Pa., assignors to GTE Sylvania Incorporated, Seneca Falls, N.Y.
No Drawing. Filed June 7, 1972, Ser. No. 260,515
Int. Cl. C09k 1/14
U.S. Cl. 252—301.4 S         1 Claim

ABSTRACT OF THE DISCLOSURE

Brightness of $Y_2O_2S$:Eu can be increased, color purity improved and lesser amounts of Eu activator can be used, if the raw materials contain about 200 p.p.m. $Hg^{+2}$ during the fabrication process.

BACKGROUND OF THE INVENTION

This invention relates to luminescent materials and more particularly to a method of increasing the brightness of $Y_2O_2S$:Eu. The europium activated yttrium oxysulfide phosphor is a known material. It luminesces under U.S. excitation and cathode ray excitation and is often used as the red-emitting phosphor in color television picture tubes. The phosphor, as it is currently made, utilizes relatively large amounts of europium activator (in the neghborhood of 5 mol percent) in order to maintain a desired level of brightness and color purity. Attempts to reduce the europium content in order to reduce the cost of the phosphor have been unsuccessful in so doing it has been found the phosphor has strong emission peaks in the green region of the spectrum (550 and 535 nm.) which effectively affects the color purity from the desired level.

It would be advantageous and an advance in the art if the brightness of $Y_2O_2S$:Eu could be increased and the color purity could be improved at lower europium concentrations.

DESCRIPTION OF THE PREFERRED EMBODIMENT

As a starting point a control phosphor was first prepared from a blended mixture of the following: 109 grams $Y_2O_3$; 5.98 grams $Eu_2O_3$; 80 grams S; 62 grams $$Na_2CO_3 \cdot H_2O$$

and .25 grams of a mixture containing 1% $Tb_4O_7$ and 99% $Y_2O_3$. This mixture, which was blended for 15 minutes to ½ hour, was fired in air in covered Alundum crucibles at temperatures between 1500° F. and 2150° F., the mixture being held at the latter temperature for about 2 hours. The mixture was then cooled to room temperature and washed with hot deionized water until neutral and then dried. Under UV excitation and 12 kv. electron excitation the material was found to have a brightness of 103% based on a standard 100% with red coordinates of Y=338 and X=653. (The standard red has Y=339; X=652.) The material was found to comprise 99.9% $Y_2O_2S$.

The novel method of this invention comprises preparing a phosphor exactly as above except that to the raw materials is added 2 grams of a mixture containing 1% HgS (as $Hg^{+2}$) and 99% $Y_2O_3$ (to provide about 200 p.p.m. $Hg^{+2}$). The blending and firing times are the same.

Under equivalent test conditions of UV (2537 nm. and 3650 nm.) excitation and 12 kv. electron excitation this material was found to have a brightness of 106% and red coordinates of Y=337 and X=654. The material was found to comprise 99.9% $Y_2O_2S$. Under visual observation quenching of the 550 and 535 nm. green peaks was observed; the quenching effect being more noticeable under UV excitation than under 12 kv. electron excitation.

Although the exact mechanism is not understood, it is theorized that the mercury atoms create vacancies in the lattice which then inhibit the various europium energy levels from dropping to their ground state in a normal fashion. Since brightness of the material is also increased, an energy transfer mechanism may also exist.

In any event, the $Y_2O_2S$:Eu prepared by this novel method differs chemically from material now being prepared commercially. Chemically, it has not yet been possible to detect any mercury in the material using current analytical techniques, which leads to the conclusion that the crystal lattic is distorted sufficiently during the firing steps so that the luminescent properties are changed significantly.

While there has been shown what is presently considered to be the preferred embodiment of the invention, it will be obvious to those skilled in the art that various changes and modifications may be made therein without departing from the scope of the invention as defined by the appended claim.

What is claimed is:
1. A method of preparing a luminescent material having the general formula $Y_2O_2S$:Eu which comprises the steps of: mixing together the following components in the indicated quantities or multiples thereof, 109 grams $Y_2O_3$, 5.98 grams $Eu_2O_3$, 80 grams S, 62 grams

$$Na_2CO_3 \cdot H_2O$$

.25 grams of a mixture containing 1% $Tb_4O_7$ and 99% $Y_2O_3$, and 2 grams of a mixture containing 1% HgS and 99% $Y_2O_3$; said mixture being blended together for 15 minutes to 30 minutes; firing said mixture in air in covered Alundum crucibles at temperatures between 1500° F. to 2150° F. with said mixture being held at substantially 2150° F. for about 2 hours; cooling said fired material to room temperature; washing said cooled material with hot deionized water until neutral; and drying said material.

References Cited
UNITED STATES PATENTS

| | | | |
|---|---|---|---|
| 3,502,590 | 3/1970 | Royce et al. | 252—301.4 S |
| 3,541,022 | 11/1970 | Hewes | 252—301.4 S |
| 3,655,577 | 4/1972 | Kano et al. | 252—301.4 S |
| 3,721,630 | 3/1973 | Mehalchick et al. | 252—301.4 S |

OSCAR R. VERTIZ, Primary Examiner

J. COOPER, Assistant Examiner